United States Patent
Hu

[19]

[11] Patent Number: 6,137,477
[45] Date of Patent: Oct. 24, 2000

[54] ENCODER WHEEL ASSEMBLY

[76] Inventor: Ken-Pei Hu, No. 22, La. 129 Yun Hsiang Shan Chuang, Sheng Kao Village, Shen Keng Shiang, Taipei Hsien, Taiwan

[21] Appl. No.: 09/132,209

[22] Filed: Aug. 11, 1998

[51] Int. Cl.[7] ....................................................... G09G 5/08
[52] U.S. Cl. ......................... 345/163; 345/167; 345/169; 341/35
[58] Field of Search .................................... 345/163, 167, 345/169; 341/35

[56] References Cited

U.S. PATENT DOCUMENTS 5,473,344  12/1995  Bacon et al. .............................. 345/163
6,043,483   3/2000  Schreiber ............................. 250/231.13

Primary Examiner—Bipin Shalwala
Assistant Examiner—Vincent E. Kovalick
Attorney, Agent, or Firm—Bacon & Thomas

[57] ABSTRACT

An encoder wheel assembly includes a wheel holder, a roller revolvably supported on the wheel holder, a locating frame fastened to the wheel holder at an outer side, and an encoder wheel mounted in between the wheel holder and the locating frame, said encoder wheel having a wheel and a toothed shaft extended from the wheel at one side and inserted through a through hole on the wheel holder and meshed with teeth inside the roller for turning with the roller, and a spring member mounted around the shaft between the wheel holder and the wheel to force the wheel toward the locating frame, the wheel having raised portions at one side engaged with respective recessed portions at the locating frame. Rotating the roller causes the wheel to induce a transducer in producing signals for scrolling or shifting pages, or for various other purposes in computer software applications.

3 Claims, 4 Drawing Sheets

ENCODER WHEEL ASSEMBLY

BACKGROUND OF THE INVENTION

The present invention relates to an encoder wheel assembly for use in an input device for scrolling or shifting pages, or for various other purposes in computer software applications.

Mice, trackballs and keyboards are commonly used computer peripheral apparatus for controlling the movement of a cursor on a display screen. A regular mouse or trackball is operated by rotating a ball with the hand to produce signals indicating movement of rotation of the ball. It is not easy to accurately move the cursor to the desired location with a mouse or trackball. Furthermore, when operating a mouse or a trackball to shift a page on the screen, it takes much time to move the mouse or to turn the ball of the trackball to the accurate position.

SUMMARY OF THE INVENTION

According to one aspect of the present invention, the encoder wheel assembly comprises a wheel holder having a through hole at one side, a roller revolvably supported on the wheel holder, the roller comprising a plurality of axially extended teeth spaced around an annular peripheral wall thereof on the inside, a locating frame fastened to the wheel holder on the outside, an encoder wheel revolvably mounted in between the wheel holder and the locating frame, the encoder wheel comprising a wheel, and a shaft extended from the center of the wheel at one side and inserted through the through hole on the wheel holder and turned with the roller, the shaft having a plurality of axially extended teeth spaced around the periphery and meshed with the teeth of the roller for enabling the shaft and the wheel to be rotated with the roller positively. According to another aspect of the present invention, the wheel of the encoder wheel has a series of notches formed along the circumference corresponding to an opening at the locating frame. When the wheel is rotated with the roller, light from a transmitter passes through the notches of the wheel and the opening at the locating frame, and a receiver is induced to provide signals indicating movement or rotation of the wheel for scrolling or shifting pages, or for various other purposes in computer software applications. According to still another aspect of the present invention, the locating frame comprises a plurality of recessed portions spaced at an inner side, and the wheel comprises a plurality of raised portions respectively forced into engagement with the recessed portions of the locating frame by a spring member, which is mounted around the shaft and stopped between the wheel holder and the wheel.

DETAILED DESCRIPTION OF THE PREFERRED EMBODIMENT

Figure 1:
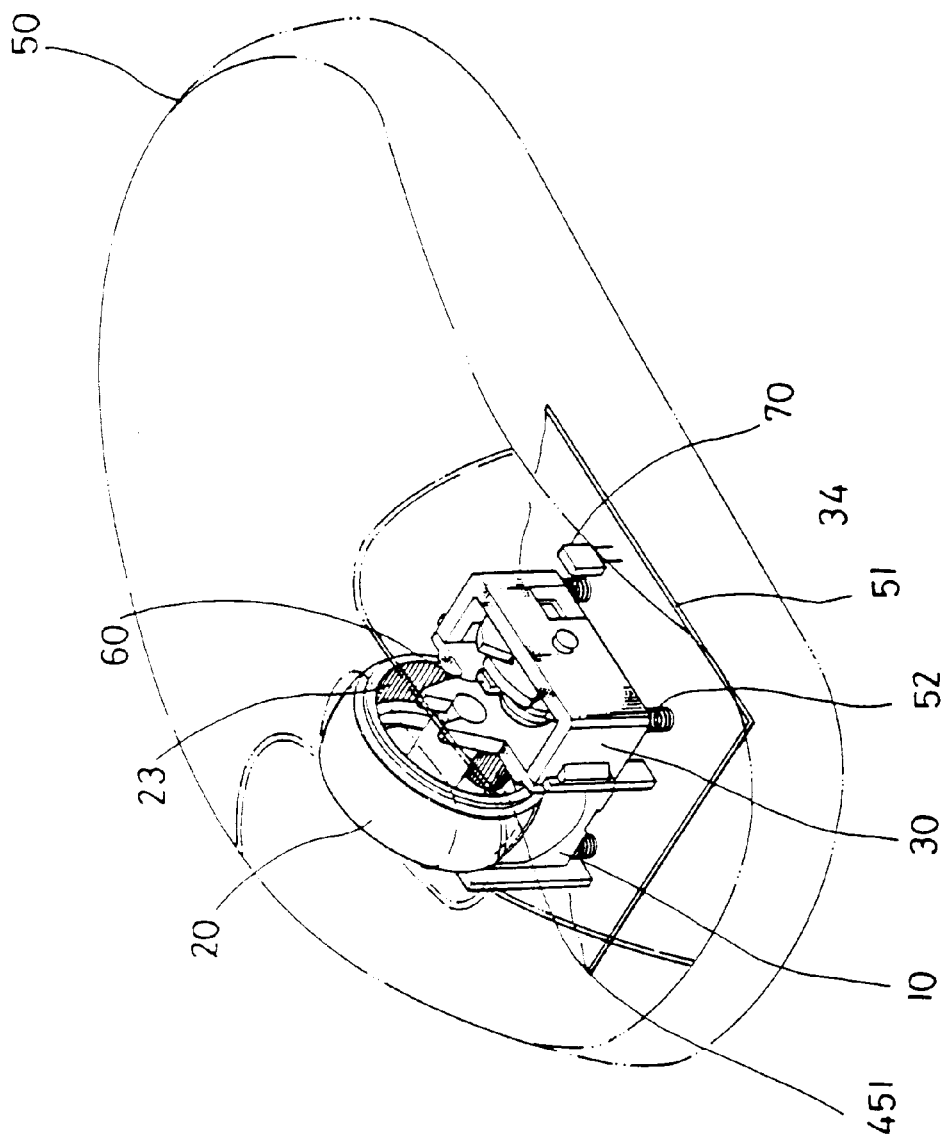
FIG. 1 is an installed view of the present invention, showing the encoder wheel assembly installed in a circuit board inside a housing.
Figure 2:
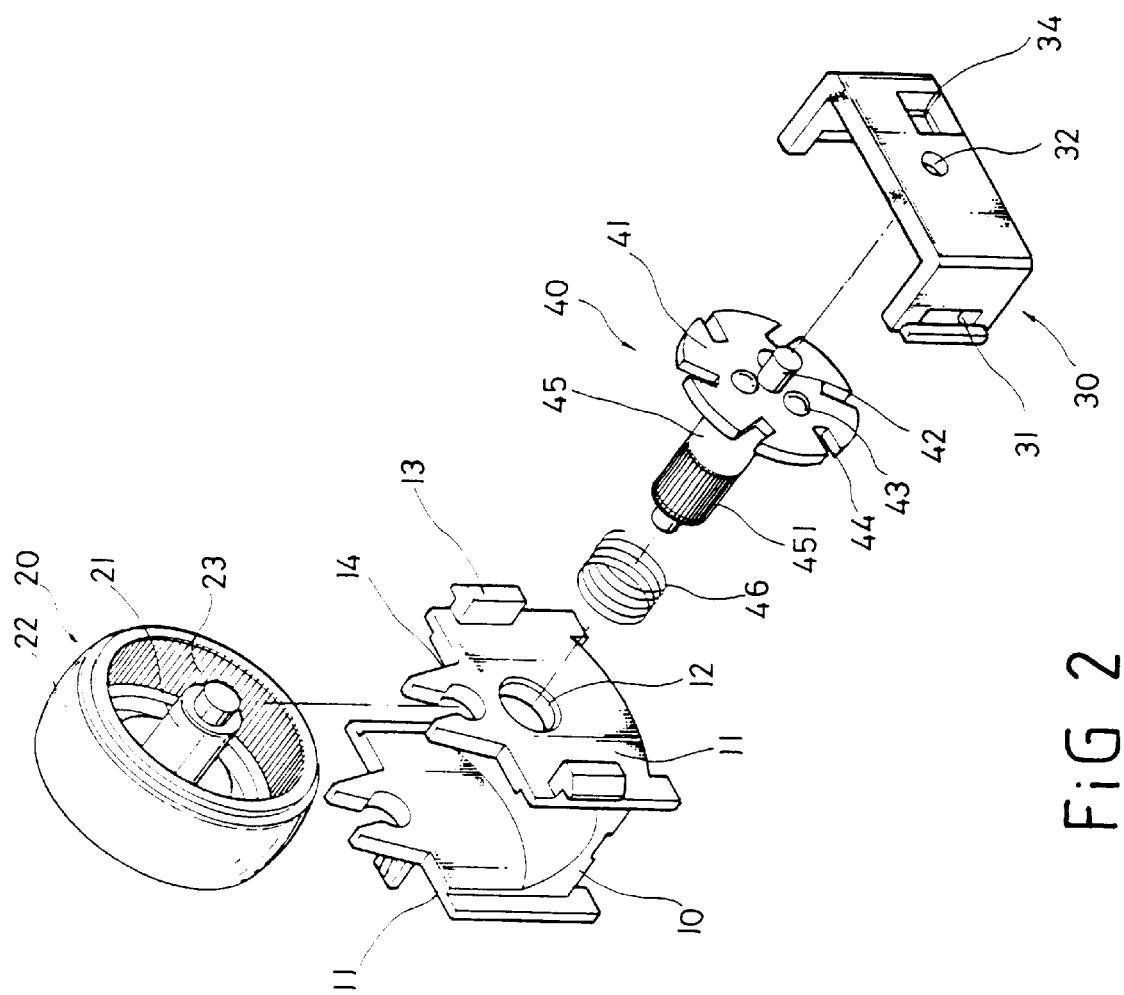
FIG. 2 is an exploded view of the present invention.
Figure 3:
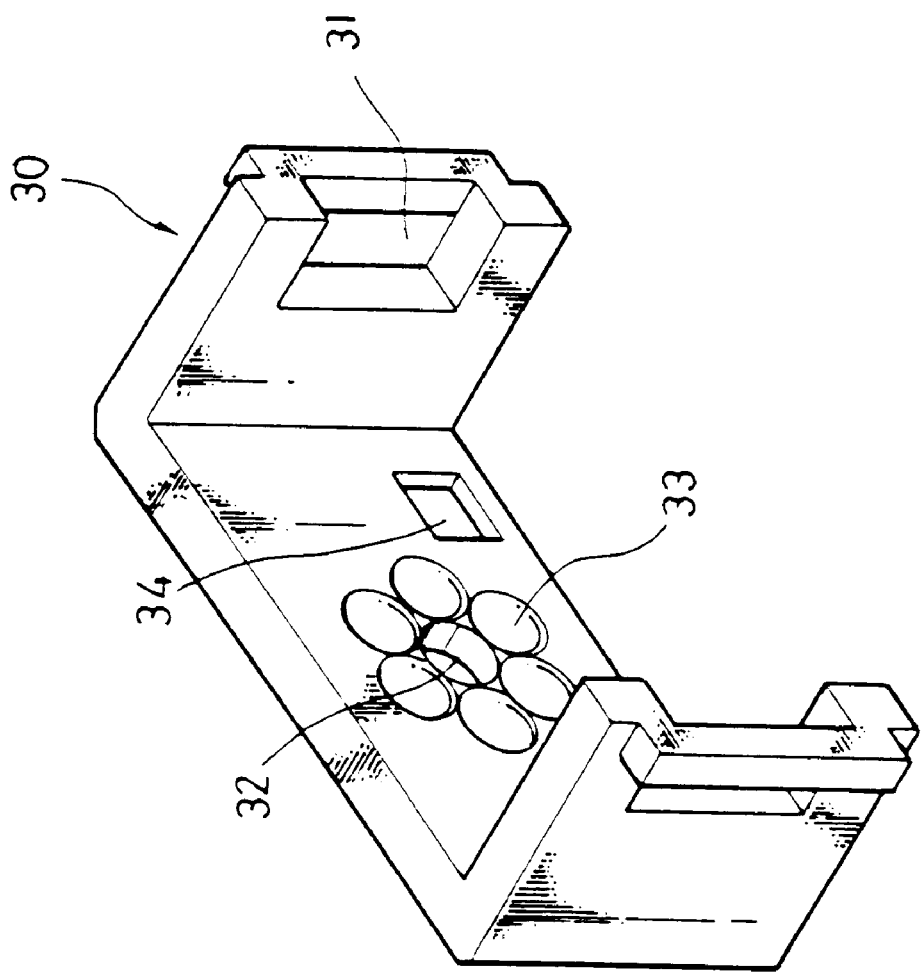
FIG. 3 shows the internal structure of the locating frame according to the present invention.

Referring to FIGS. 1, 2 and 3, an encoder wheel assembly is designed for use in a remote controller, mouse, keyboard, or any other input device for scrolling or shifting pages, or for various other purposes in computer software applications. The encoder wheel assembly comprises a wheel holder 10. The wheel holder 10 comprises two upright side walls 11 arranged in parallel. One upright side wall 11 has a through hole 12, and two reversed hooks 13 bilaterally raised from an outer side thereof. Both upright side walls 11 each have an axle hole 14 for holding a roller 20. The roller 20 comprises a wheel axle 21 at the center coupled to the axle holes 14 of the upright side walls 11, a rubber outer race 22 spaced around the wheel axle 21, and a plurality of axially extended teeth 23 spaced around the inside wall of the outer race 22. A locating frame 30 is fastened to the hooks 13 outside the wheel holder 10. The locating frame 30 (which can have any of a variety of shapes) comprises two hook holes 31 at two opposite ends thereof respectively forced into engagement with the hooks 13 of the wheel holder 10, a through hole 32 aligned with the through hole 12 at one upright side wall 11 of the wheel holder 10, a plurality of recessed portions 33 spaced around the through hole 12 at an inner side, and an opening 34 adjacent to the recessed portions 33 (see FIG. 3). An encoder wheel 40 is provided between the wheel holder 10 and the locating frame 30. The encoder wheel 40 comprises a wheel 41 and a shaft 45 extended from the center of the wheel 41 at one side. The wheel 41 comprises a wheel pin 42 raised from the center of at an outer side opposite to the shaft 45 and inserted into the through hole 32 on the locating frame 30, a plurality of raised portions 43 spaced around the wheel pin 42 for engagement with the recessed portions 33 at the locating frame 30, and a series of notches 44 formed along the circumference corresponding to the opening 34 at the locating frame 30. The shaft 45 is inserted through the through hole 12 at one upright side wall 11 of the wheel holder 10 into the inside space of the roller 20, having a plurality of axially extended teeth 451 spaced around the periphery and meshed with the axially extended teeth 23 of the roller 20. A spring member 46 is mounted around the shaft 45 of the encoder wheel 40, and stopped between one upright side wall 11 of the wheel holder 10 and the wheel 41. The spring member 46 imparts an outward pressure to the wheel 41, causing the raised portions 43 of the wheel 41 to be forced into engagement with the recessed portions 33 of the locating frame 30.

Figure 5:
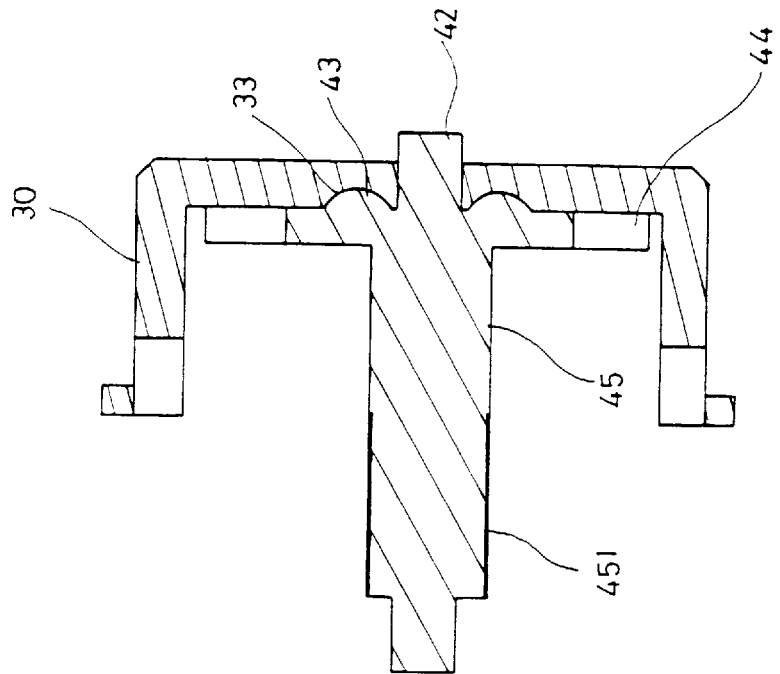
FIG. 5 is a sectional view showing the raised portions of the wheel engaged with the recessed portions of the locating frame according to the present invention.
Figure 4:
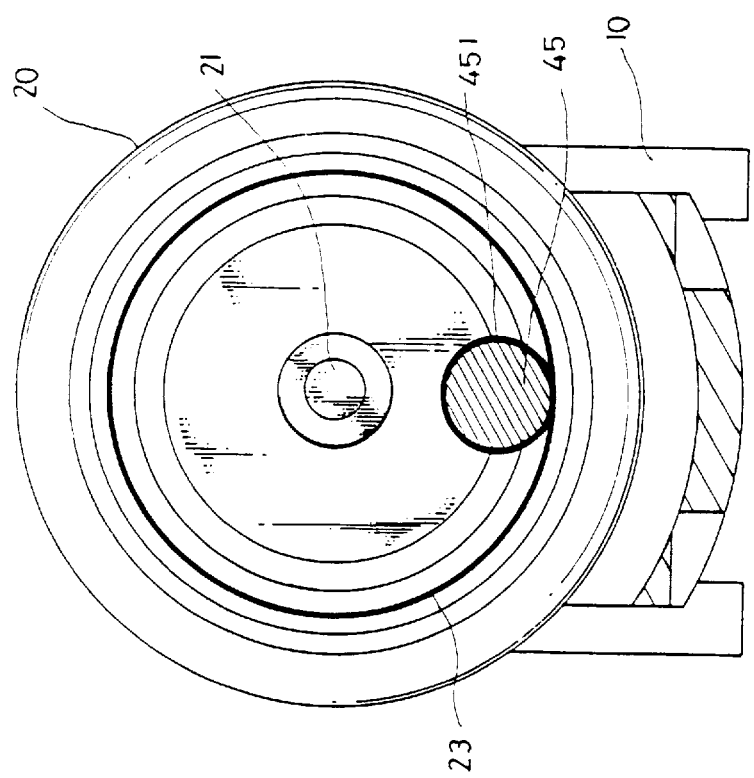
FIG. 4 is a sectional view showing the shaft meshed with the roller according to the present invention.

Referring to FIGS. 4 and 5 and FIGS. from 1 through 3 again, the encoder wheel assembly is mounted on a circuit board 51 inside a housing 50. A plurality of spring members 52 are provided at the circuit board 51 to support the wheel holder 10 and the locating frame 30. When the user rotates the roller 20 with the finger, the encoder wheel 40 is rotated with the roller 20 (because the teeth 451 of the shaft 45 are meshed with the teeth 23 of the roller 20), causing the notches 44 of the wheel 41 to pass over the opening 34 at the locating frame 30 one after another. When the wheel 41 is rotated, light from a transmitter 60 in the wheel holder 10 intermittently passes through the notches 44 of the wheel 41 and the opening 34 of the locating frame 30, and a receiver 70 is induced to provide signals indicating movement or rotation of the wheel 41 for scrolling or shifting pages, or for various other purposes in computer software applications.

When the user presses down the roller 20 with the fingers, the spring members 52 are compressed, and a wheel holder 10 is lowered to trigger switch means at the circuit board 51. Because the raised portions 43 of the wheel 41 are engaged with the recessed portions 33 of the locating frame 30 and the teeth 23 of the roller 20 are meshed with the teeth 451 of the shaft 45, the roller 20 is stopped in position when it is depressed (see FIG. 5).

While only one embodiment of the present invention has been shown and described, it will be understood that various modifications and changes could be made thereunto without departing from the spirit and scope of the invention disclosed.

What the invention claimed is:

1. An encoder wheel assembly comprising:

a wheel holder having a through hole at one side;

a roller pivoted to said wheel holder, said roller comprising a plurality of axially extended teeth spaced around an annular peripheral wall thereof on the inside;

a locating frame fastened to said wheel holder on the outside, said locating frame having a through hole aligned with the through hole on said wheel holder, and an opening;

an encoder wheel mounted in between said wheel holder and said locating frame, said encoder wheel comprising a wheel, and a shaft extended from the center of said wheel at one side and inserted through the through hole on said wheel holder and turned with said roller, said wheel comprising a wheel pin at the center of one side thereof inserted into the through hole on said locating frame, and a series of notches formed along the circumference thereof corresponding to the opening at said locating frame, said shaft having a plurality of axially extended teeth spaced around the periphery and meshed with the axially extended teeth of said roller; and a spring member mounted around said shaft and stopped between said wheel holder and said wheel to force said wheel toward said locating frame.

2. The encoder wheel assembly of claim 1 wherein said locating frame comprises a plurality of recessed portions spaced around the through hole of said locating frame at an inner side, and said wheel comprises a plurality of raised portions spaced around said wheel pin and respectively forced into engagement with the recessed portions of said locating frame.

3. The encoder wheel assembly of claim 1 wherein said wheel holder comprises two reversed hooks raised from an outside wall thereof at two opposite sides of the through hole on said wheel holder, and said locating frame comprises two hook holes at two opposite ends thereof respectively forced into engagement with the reversed hooks of said wheel holder.

\* \* \* \* \*